(12) United States Patent
He et al.

(10) Patent No.: US 11,682,311 B2
(45) Date of Patent: Jun. 20, 2023

(54) SYSTEMS AND METHODS FOR DISPLAYING WEATHER DATA

(71) Applicant: HONEYWELL INTERNATIONAL INC., Morris Plains, NJ (US)

(72) Inventors: Gang He, Morristown, NJ (US); Zhihao Qin, Shanghai (CN); Ivan Wyatt, Scottadale, AZ (US); Thea Feyereisen, Hudson, WI (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 371 days.

(21) Appl. No.: 16/927,456

(22) Filed: Jul. 13, 2020

(65) Prior Publication Data

US 2022/0013022 A1 Jan. 13, 2022

(51) Int. Cl.
| | |
|---|---|
| *G06F 3/0484* | (2022.01) |
| *G08G 5/00* | (2006.01) |
| *G01S 7/22* | (2006.01) |
| *G01S 13/95* | (2006.01) |
| *G06F 3/04842* | (2022.01) |

(52) U.S. Cl.
CPC .............. *G08G 5/0091* (2013.01); *G01S 7/22* (2013.01); *G01S 13/953* (2013.01); *G06F 3/04842* (2013.01); *G01S 13/951* (2013.01); *G01S 13/955* (2013.01)

(58) Field of Classification Search
CPC .. G08G 5/0091; G08G 5/0013; G08G 5/0021; G08G 5/0052; G01S 7/22; G01S 13/953; G01S 13/951; G01S 13/955; G06F 3/04842; G09B 9/16; G01W 1/10
See application file for complete search history.

(56) References Cited

U.S. PATENT DOCUMENTS

| | | | |
|---|---|---|---|
| 9,000,972 B1 * | 4/2015 | Cahoon | G01S 13/723 342/26 B |
| 9,126,695 B2 | 9/2015 | Latorre-Costa et al. | |
| 9,810,770 B1 | 11/2017 | Weichbrod et al. | |
| 10,175,353 B2 | 1/2019 | Kronfeld et al. | |
| 2014/0039734 A1 * | 2/2014 | Ramaiah | G08G 5/0091 701/14 |
| 2016/0041305 A1 * | 2/2016 | Stulken | G08G 5/0021 340/977 |
| 2017/0032576 A1 | 2/2017 | Mazoyer et al. | |
| 2017/0158345 A1 | 6/2017 | Saez et al. | |
| 2017/0183105 A1 | 6/2017 | Fournier et al. | |

FOREIGN PATENT DOCUMENTS

| | | | |
|---|---|---|---|
| EP | 2159544 A1 | 3/2010 | |
| EP | 2985747 A1 | 2/2016 | |
| EP | 3470791 A1 | 4/2019 | |
| EP | 3660461 A1 | 6/2020 | |

* cited by examiner

*Primary Examiner* — Phuong H Nguyen
(74) *Attorney, Agent, or Firm* — Lorenz & Kopf LLP

(57) ABSTRACT

Methods and systems of displaying weather data for a cockpit display system of an aircraft. The methods and systems include generating a display to include a first graphical map of real-time weather data from a weather radar. The display further includes a notification graphic associated with a portion of part of a displayed flight plan in which a significant weather condition exists. When the notification graphic is selected, the display includes the first graphical map of the real time weather data based on weather data from the weather radar and a second graphical map of significant weather conditions data derived from transmitted weather data.

20 Claims, 4 Drawing Sheets

SYSTEMS AND METHODS FOR DISPLAYING WEATHER DATA

TECHNICAL FIELD

The present disclosure generally relates to systems for displaying weather data on a cockpit display system of an aircraft. More particularly, the present disclosure relates to systems and methods for automatically displaying weather data from different sources.

BACKGROUND

An increasing number of weather products are available for use by flight crew. The abundance of weather products is creating an overly complex information set that needs to be reviewed and understood by the flight crew. This can lead to increased flight crew workload and an increased probability that flight crew may reach an incorrect conclusion when reviewing weather data and making sub-optimal flight decisions based on the weather data. Transmitted weather data from various sources is delayed and may not represent a real-time situation, whereas radar weather data, whilst real-time, is of limited range. Transmitted weather data can be difficult to process by a flight crew because of a large geographical range and differing degrees of relevancy included in the same data set. Further, there may be low confidence in transmitted weather data because of the delay. There are difficulties in cross-referencing real time weather data from radar and transmitted weather data because of the need to switch between different weather sources.

Hence, it is desirable to provide systems and methods for assisting flight crew with a review of weather data. More specifically, it is desirable to provide methods and systems to simplify, and make more efficient, cross-referencing of real time radar weather data and transmitted weather data. Yet further, the source of the weather data should be discernable by the flight crew and any displays should be clear and uncluttered. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Methods and systems are provided for displaying weather data for a cockpit display system of an aircraft. The methods and systems include generating a display to include a first graphical map of real-time weather data from a weather radar. The display further includes a notification graphic associated with a portion of part of a displayed flight plan in which a significant weather condition exists. When the notification graphic is selected, the display includes the first graphical map of the real time weather data based on the weather data from the weather radar and a second graphical map of significant weather conditions data derived from transmitted weather data.

Furthermore, other desirable features and characteristics will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
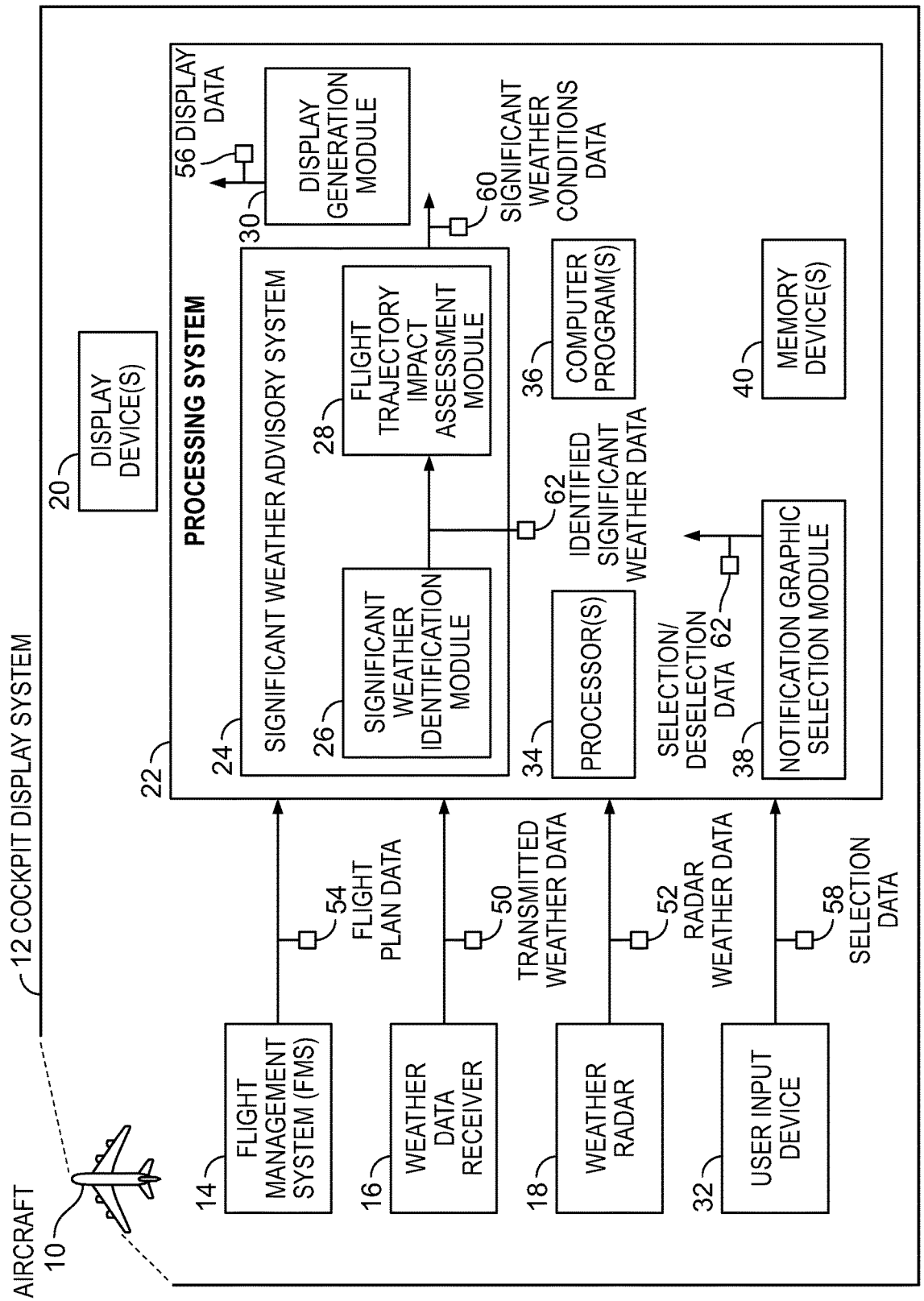
FIG. 1 is a block diagram depicting a cockpit display system, in accordance with an exemplary embodiment.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses systems and methods for displaying significant weather conditions data and radar weather data on a cockpit display device. In embodiments, a cursor interactive approach is used to selectively display the significant weather conditions data together with real time real-time radar weather data. In embodiments, if one flight plan segment is identified as passing through one region with significant weather conditions data (e.g. severe weather), the flight plan segment is highlighted on the display device (e.g. on a navigation or horizontal situation map presentation) and a real-time weather radar data map presentation is displayed at the same time. In embodiments, when a cursor is hovering over the highlighted flight plan segment (or the highlighted flight plan segment is otherwise selected), the related significant weather conditions data is displayed in a map presentation. When the cursor leaves the highlighted flight plan segment (or is not positioned thereover), the map presentation of the related significant weather conditions data is removed (or is not displayed). Thus, a logic is included in the systems and methods described herein to detect when the cursor is hovering over/leaving the highlighted flight plan segment (or other types of selecting/deselecting of the highlighted flight plan segment). The logic sends a signal to a weather radar display function to display or not display the map of the significant weather conditions data. When the significant weather conditions data is displayed, the presentation of the radar weather data is displayed at the same time but is made dimmer/lighter than before. During the whole process, pilots just need to move the cursor in and out of the highlighted flight plan segment (or otherwise select and deselect) to compare the radar and significant weather data. This comparison allows accuracy of delayed significant weather data to be verified by comparison with the real time radar weather data. The comparison can be easily and intuitively performed whilst a highly relevant, uncluttered display is maintained.

FIG. 1 is a schematic diagram of a cockpit display system 12 of an aircraft 10. The cockpit display system 12 includes a flight management system 14, a weather data receiver 16, an onboard weather radar 18, a user input device 32, one or more display devices 20 and a processing system 22. It should be understood that FIG. 1 is a simplified representation of the cockpit display system 12, and FIG. 1 is not intended to limit the application or scope of the subject matter in any way. In practice, the cockpit display system 12 will include numerous other devices and components for providing additional functions and features, as will be appreciated in the art.

In embodiments, the aircraft 10 includes a cockpit, one or more engines, and a fuselage. The aircraft 10 can be a multicopter (or rotary-wing), fixed-wing or a tilt-wing aircraft. The aircraft 10 can be an airplane or a helicopter or other aircraft with powered rotors, such as cyclogyros/cyclocopters and tiltrotors.

In embodiments, the cockpit display system 12 includes the flight management system 14, which manages the flight control of the aircraft 10. For instance, the flight management system 14 implements, manages, and/or controls a flight mode, flight path, flight plan, flight trajectory, etc. for the aircraft 10. The flight management system 14 receives an input from a user via the user input device 32. The flight management system 14 can be configured to implement one or more flight mode(s), flight plans, etc. of the aircraft 10 selected by user input and display information associated with the one or more flight mode(s) on the one or more display devices 20. In embodiments, a navigation function of the flight management system 14 allows a route to be programmed by a user through the user input device 32. A flight director (not shown) and an auto-pilot system (not shown) can steer the aircraft 10 along the desired course to an active waypoint. When the aircraft reaches an active waypoint, the flight management system 14 automatically sequences to the next waypoint in the route, unless waypoint sequencing is suspended. The flight management system 14 outputs flight plan data 54 defining waypoints making up a flight plan for the aircraft 10.

In embodiments, the user input device 32 is located in the cockpit and provides input to one or more system(s) of the aircraft 10. The user input device 32 includes any device suitable to accept input from a user for interaction with the systems of the aircraft 10. For example, the user input device 32 includes one or more of a keyboard, joystick, multi-way rocker switches, mouse, trackball, touch screen, touch pad, data entry keys, a microphone suitable for voice recognition, and/or any other suitable device. The user input device 32 allows the user to interact with a graphic and/or textual data element provided for display on the one or more display devices 20. In particular embodiments, the user input device 32 can be controlled by a user to select and deselect a notification graphic 204A, 204B (FIG. 3) on a weather presentation of the one or more display devices 20. The notification graphic 204A, 204B is located along a displayed flight plan at a location where significant weather conditions are expected based on transmitted weather data 50 (e.g. unlinked and/or downlinked weather data 50).

Figure 3:
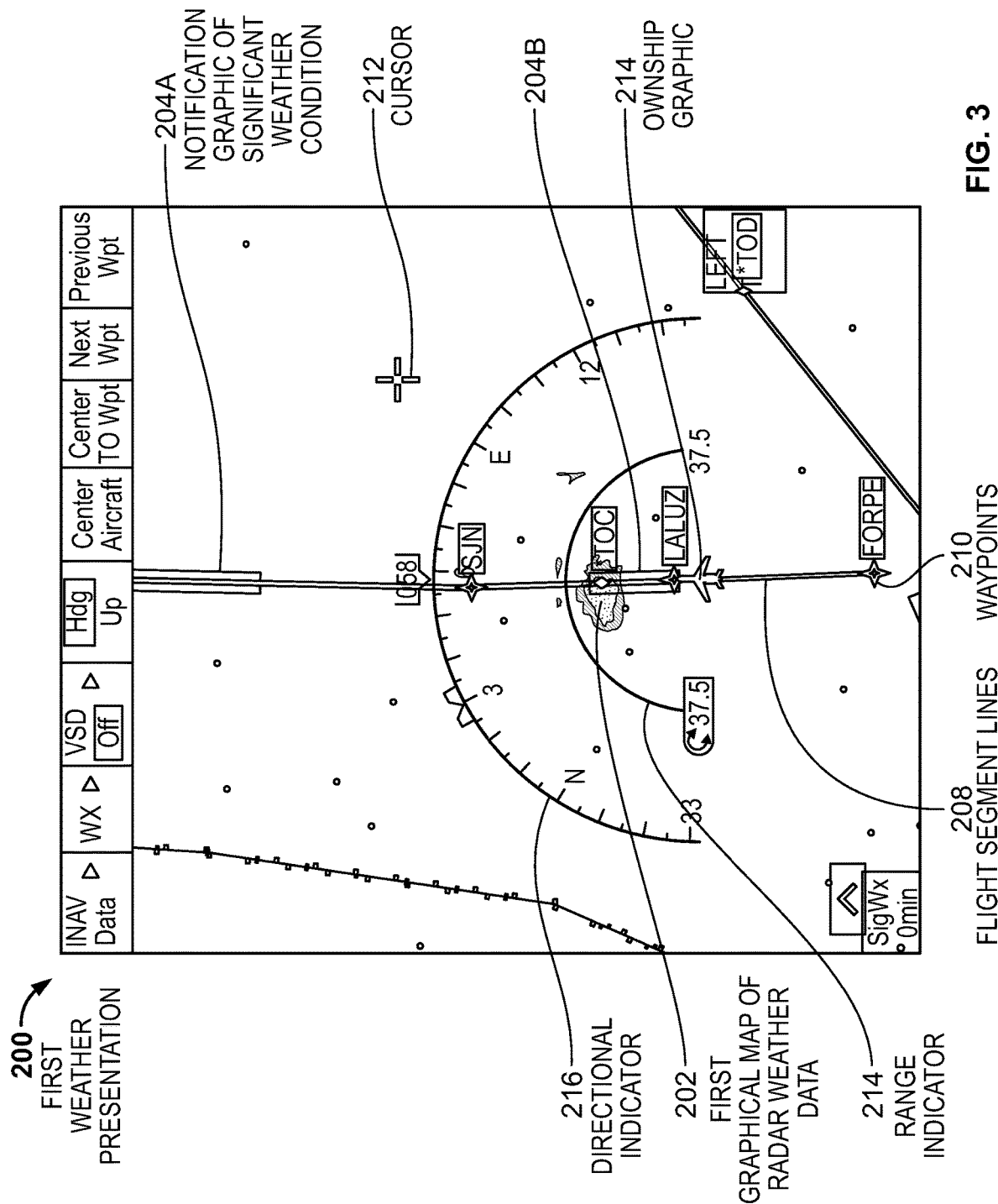
FIG. 3 is a presentation generated by the cockpit display system, in accordance with an exemplary embodiment.
Figure 4:
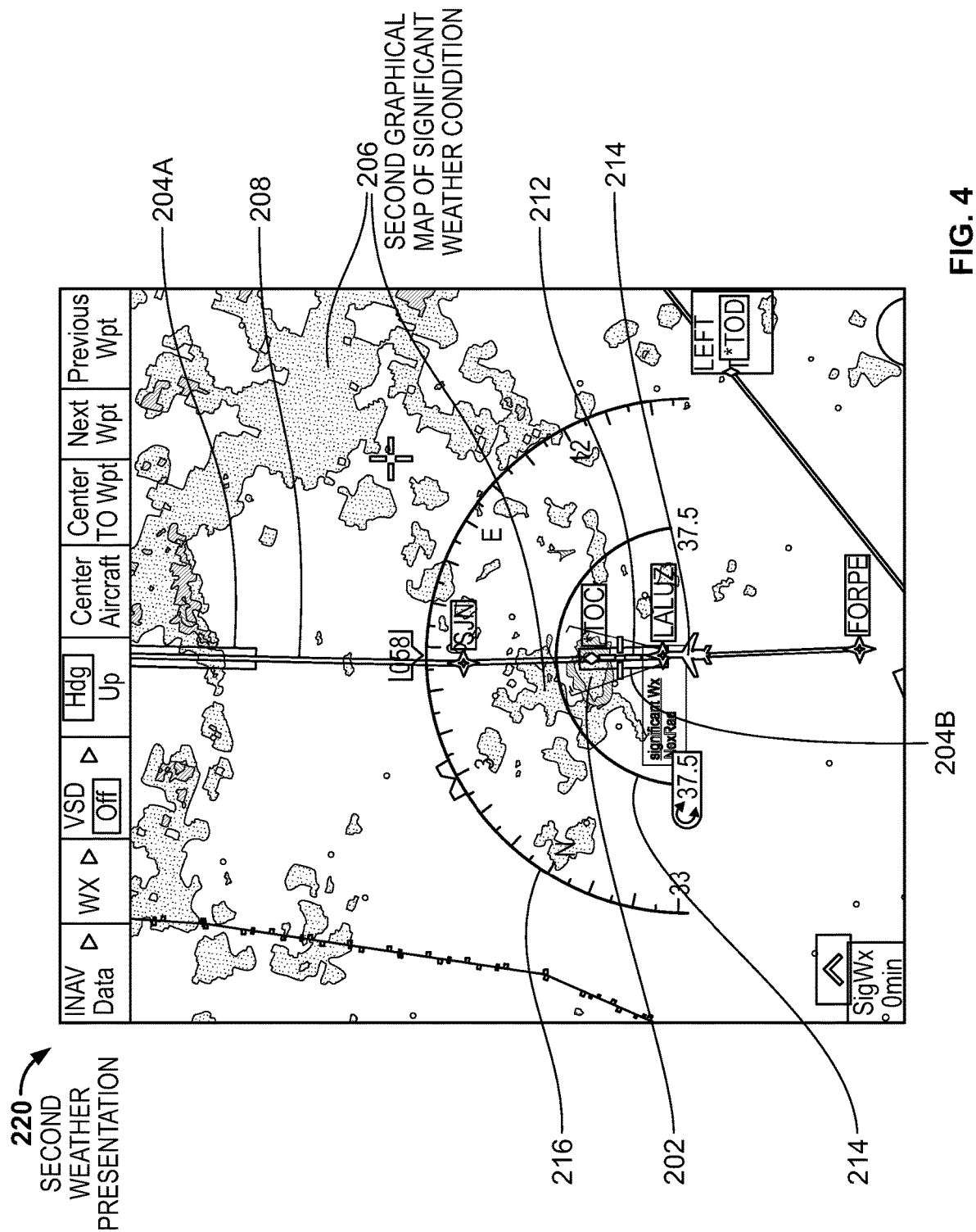
FIG. 4 is a presentation generated by the cockpit display system, in accordance with an exemplary embodiment.

In embodiments, and with reference to FIGS. 1, 3 and 4, the one or more display devices 20 includes a head down display (HDD), a head up display (HUD), a wearable HUD, a portable display or any combination thereof. The one or more display devices 20 output a weather presentation (e.g. the first weather presentation 200 of FIG. 3 and the second weather presentation 220 of FIG. 4) that includes waypoints 210 connected by flight segment lines 208. Some parts of the flight segment lines are highlighted to provide a notification graphic 204A, 204B of significant weather at locations where significant weather conditions are expected based on the transmitted weather data 50. The weather presentations 202, 220 include a first graphical map 202 of radar weather data and selectively include a second graphical map 206 of significant weather conditions depending upon whether the notification graphic 204A, 204B has been selected through the user input device 32. The weather presentations are provided on a multi-function display screen, a navigation display screen or on a combined screen showing both a primary flight display and the navigation display. The weather presentations can be enabled as part of an electronic horizontal situation indicator (HSI), which includes a MAP mode showing an ownship aircraft graphic 214 against a detailed moving map background. Navigational aids are shown (such as a range indicator 214 (e.g. part or whole of a range ring) and a directional indicator 216 (e.g. a part or whole of a compass ring)), as well as other airports and waypoints 210. The weather presentations 200, 220 are shown to scale as an overlay on a realistic moving map background including terrain information. In embodiments, the HSI depicts other air traffic when integrated with a traffic system.

In embodiments, the cockpit display system 12 includes the airborne weather radar 18, which is a type of radar used to provide an indication to pilots of the intensity of convective weather. The weather radar 18 includes, in one embodiment, a doppler radar capable of detecting the motion of rain droplets in addition to intensity of precipitation. A radar antenna of the weather radar 18 may be located in the nose of the aircraft 10. Signals from the radar antenna are processed by a computer (e.g. by the one or more processors 34 of the processing system 22) and are presented on a screen of the one or more display devices 20, which may be viewed by the pilots to visualize at least precipitation including coding (e.g. color coding) for intensity of precipitation, density of precipitation, type of precipitation and/or motion of rain droplets. In particular, a first graphical map 202 of radar weather data is presented on the first and second weather presentations 202, 204 (as shown in FIGS. 3 and 4). However, a brightness or some other visual aspect of the first graphical map 202 is changed when the notification graphic 204A, 204B is selected and deselected to allow visual differentiation of the first and second graphical maps 202, 220 when they are shown together in the second weather presentation 220. Droplet size can be a good indicator of strong updrafts within cumulonimbus clouds, and associated turbulence, and may be indicated on the screen by patterns or color coded for intensity. The weather radar 18 may also be able to predict and display the presence of wind shear.

In embodiments, the cockpit display system 12 includes the weather data receiver 16, which receives transmitted weather information from various external sources. The weather data receiver 16 may include Automatic Dependent Surveillance Broadcast (ADS-B) that uses uplinks from ground stations of weather service providers and/or other aircraft and downlinks from satellites of weather service providers. The weather data receiver 16 can receive weather data from various sources including surface aviation weather observations from ground stations (e.g. METARs), air traffic control weather information, upper air weather observations (e.g. aircraft meteorological data relay (AMDAR) and ground-based, satellite or aircraft mounted radar observations (e.g NEXRAD). Satellite datalink services allow sharing of weather information to provide detailed and comprehensive transmitted weather data 50. The transmitted weather data 50 can include current and forecast weather data e.g. time and location specific weather data.

Figure 2:
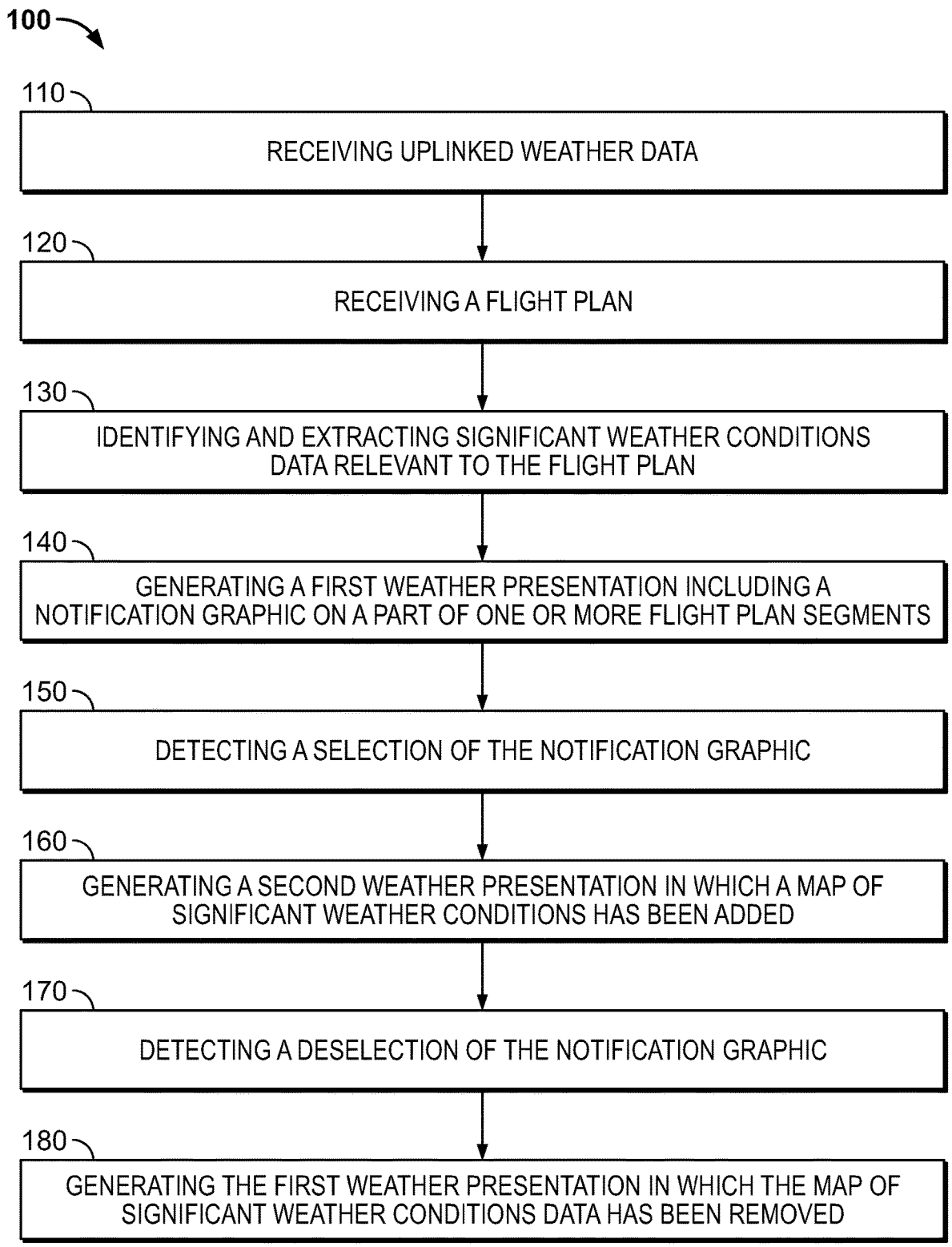
FIG. 2 is a flow chart of a method of displaying weather data, in accordance with an exemplary embodiment.

In embodiments, the processing system 22 implements functions of the cockpit display system 12 of FIG. 1 and steps of the method 100 of FIG. 2 according to example embodiments of the present disclosure. The processing system 22 includes one or more processor(s) 34 and one or more memory device(s) 40. The one or more processor(s) 34 can include any suitable processing device, such as a microprocessor, microcontroller, integrated circuit, logic device, or other suitable processing device. The one or more memory device(s) 40 can include one or more computer-readable media, including, but not limited to, non-transitory computer-readable media, RAM, ROM, hard drives, flash drives, or other memory devices.

The one or more memory device(s) 40 can store information accessible by the one or more processor(s) 34, including one or more computer program(s) 36, which include computer-readable instructions that can be executed by the one or more processor(s) 34. The instructions can be any set of instructions that, when executed by the one or more processor(s) 34, cause the one or more processor(s) 34 to perform operations. The instructions can be software written in any suitable programming language or can be implemented in hardware. In some embodiments, the instructions can be executed by the one or more processor(s) 34 to cause the one or more processor(s) 34 to perform operations, such as the operations for generating the weather presentations 200, 220 of FIGS. 3 and 4 and implementing the flight management system 14. Further, the instructions can be executed by the one or more processor(s) 34 to cause the one or more processor(s) 34 to perform operations to generate the weather presentations 200, 220 and to detect and implement display responses to selections and deselections of the notification graphic 204A, 204B.

The memory device(s) 40 can further store data that can be accessed by the processors 34. For example, the data can include a navigational database, data associated with the navigation system(s), data associated with the control mechanisms, data indicative of a flight plan associated with the aircraft 10, data associated with flight director mode selection, data associated with a flight management system 14, terrain data for use in generating the weather presentations 200, 220 and/or any other data associated with aircraft 10, as described herein. The data can include one or more table(s), function(s), algorithm(s), model(s), equation(s), etc. for navigating the aircraft 10 according to example embodiments of the present disclosure.

In embodiments, the processing system 22 executes a significant weather advisory system 24. The significant weather advisory system 24 retrieves transmitted weather data 50 for use during flight or mission planning from external weather/framework service provider(s). The weather data 50 may include information regarding atmospheric conditions and wind that the aircraft 10 may encounter that the flight crew might need to know about during flight. External weather service provider(s) may include any service provider (e.g., Sirius XM or GoDirect Weather) that offers a strategic weather solution that can provide weather data for integrated avionics products (e.g., Uplink Weather for INAV or GoDirect Weather for INAV) and/or EFB applications (e.g., Flight Bag Pro or Weather Information Service).

The example significant weather advisory system 24 is configured to analyze the transmitted weather data 50 (e.g., atmospheric conditions, wind, etc.) received from weather/framework service provider(s), provide the flight crew with summary information highlighting the most significant weather conditions that may impact the aircraft during flight, and provide an efficient way for the flight crew to focus in on specific weather details. The example significant weather advisory system 24 includes a significant weather identification module 26 and a flight trajectory impact assessment module 28.

The significant weather identification module 26 reviews the transmitted weather data 50, and identifies current significant weather conditions from the transmitted weather data 50. In one example, significant weather conditions are the subset of available weather conditions that can potentially have a significant impact on flight and require the flight crew's active awareness. Table 1 below lists example weather conditions that may be considered significant weather conditions.

TABLE 1

| Phenomenon | Level | Condition |
|---|---|---|
| Icing | Severe | Always |
| | Heavy | Always |
| | Moderate | In case of engine failure or de-icing system failure |
| Turbulence | High potential | Always |
| | Moderate potential | Always |
| | Low potential | Configurable |
| Thunderstorm | Red reflectivity | Minimal distance from flight plan required |
| | Amber reflectivity | Minimal distance from flight plan required |
| | PIREP or SIGMET | Always |
| | Lightning | For areas without radar coverage |
| Temperature | Any | ISA deviation over +/−15° C. or over |

TABLE 1-continued

| Phenomenon | Level | Condition |
|---|---|---|
| METAR | Departure and destination airport | Conditions not allowing take off or planned landing type |

To identify current significant weather conditions, the example significant weather identification module 26 is configured to apply predetermined criteria to automatically identify significant weather data (for example high potential turbulence may always be considered a significant weather conditions); apply pre-designated flight crew preferences to automatically identify significant weather data (for example the flight crew may designate low potential turbulence as being a significant weather condition); identify, based on the status of one or more aircraft systems, significant weather data that is significant because of the status of the one or more aircraft systems (for example in the presence of a de-icing system failure, moderate icing may be considered as a significant weather condition); identify significant weather data that is significant because it impacts projected take-off conditions (for example METAR data, such as high winds, that indicates that conditions do not allow for takeoff at a scheduled runway can be considered as a significant weather condition); and identify significant weather data that is significant because it impacts projected landing conditions (for example METAR data, such as fog or visibility conditions, that indicates that conditions do not allow for a planned landing type at a schedule airport. In embodiments, the significant weather identification module 26 outputs identified significant weather data, which is a filtered subset of the transmitted weather data 50 representing significant weather conditions that have been identified as fulfilling predetermined weather criteria. That is, the significant weather identification module 26 applies a weather based criteria filter to filter out weather data from the transmitted weather data 50 that does not meet weather significance criteria. The weather significance criteria are not distance dependent.

The flight trajectory impact assessment module 28 determines whether the transmitted weather data 50 or the identified significant weather data 62 has the potential to impact the aircraft during its projected flight path. To determine the potential impact to the aircraft's flight path, the example flight trajectory impact assessment module 28 filters out, from the current significant weather conditions, potentially significant weather conditions from a weather impacted area that will not be intersected by a geographical corridor around the projected flight path and filters out, from the current significant weather conditions, potentially significant weather conditions that will not exist within the time frame during which the aircraft is planned to pass through the weather impacted area. To assess the impact of the identified significant weather conditions (as represented in the identified significant weather data 62) on the flight trajectory, the significant weather identification module 26 identifies areas experiencing the identified significant weather conditions in the identified significant weather data 62 that are within predetermined proximity limits from the projected flight path from the flight plan data 54 or weather that directly intersects the projected flight path from the flight plan data 54 (e.g., laterally for 2D data, laterally and vertically at once for 3D data). Although significant weather identification module 26 is described as processing the transmitted weather data 50 before the flight trajectory impact assessment module 28, this ordering could be reversed depending on which order has greater processing efficiency.

Accordingly, the significant weather advisory system 24 includes modules 26, 28 and receives transmitted weather data 50. The modules 26, 28 serve to apply a weather relevancy filter using one or more weather criteria (fixed and flight adaptive) and to apply a distance relevancy filter using one or more criteria of distance relative to flight plan. In this way, significant weather advisory system 24 outputs significant weather conditions data 60, which is a filtered version of transmitted weather data, which has been filtered to remove insignificant weather based on the weather data itself and weather data that is not significant with respect to location relative to the flight plan.

The assessment of impact on flight trajectory is performed by the example flight trajectory impact assessment module 28 every time new transmitted weather data 50 is received. To perform the assessment, the example flight trajectory impact assessment module 28 considers the transmitted weather data 50 or the identified significant weather data 62, the flight plan (e.g., from flight deck equipment such as the FMS 14) represented by the flight plan data 54, aircraft systems status (e.g., from flight deck equipment such as the CMCs), and configurable flight crew's preferences for significant weather advisory that are set in advance (e.g., before flight) by the flight crew.

In another example, the significant weather identification module 26 assesses the impact of the identified significant weather conditions on flight trajectory by creating identified significant weather data 62 by processing newly received transmitted weather data 50. Creating the identified significant weather data 62 includes processing newly received transmitted weather data 50 and including in the identified significant weather data 62: (i) the subset of received data that always qualifies as a significant weather condition without any further conditions (which is a predetermined criteria based on weather type), (ii) optionally the subset of received data that qualifies as a significant weather condition based on pre-identified flight crew preferences (e.g., stored in a configuration file); and (iii) optionally the subset of received data that qualifies as a significant weather condition based on the current state of various aircraft systems. From the identified significant weather data 62, the flight trajectory impact assessment module 28: (i) determines the location at which the significant weather condition intersects or is within proximity limits to a projected flight path from the flight plan data 54 (laterally and/or vertically); (ii) optionally determining if the conditions at departure and arrival airports allow take-off and landing; and (iii) optionally including in the significant weather condition data 60 (a) the significant weather information that intersects or is within proximity limits to a projected flight path or (b) information regarding the conditions at departure and arrival airports that prevent take-off and landing, but only if the significant weather information is projected to be valid around the estimated time at which the projected flight path comes in proximity to or intersects the weather events/conditions.

In embodiments, the processing system 22 includes a display generation module 30 for generating the first and second weather presentations 200, 220. The display generation module 30 receives the radar weather data 52, which provides local (depending on radar range), real time weather information. The radar weather data 52 is known to be current, but is limited in range and may not have as much information depth as weather data transmitted from external sources. The display generation module 30 receives the significant weather conditions data 60. The significant weather conditions data 60 is geospatial data. The first weather presentation 200 includes a first graphical map 202 presenting the radar weather data 52 including geospatial indication of severity (e.g. density) of weather (e.g. precipitation and/or wind) as determinable from the radar weather data 52. The indication of severity may be made by visual coding such as color coding. The first weather presentation 200 further includes one or more notification graphics of significant weather conditions 204A, 204B. The notification graphic 204A, 204B is a highly simplified visualization of where significant weather conditions are to be encountered on the flight plan based on the significant weather conditions data 60. The display generation module 30 displays the flight plan in the form of waypoints 210 and flight segment lines 208 connecting the waypoints 210 based on the flight plan data 54. The display generation module 30 converts the geospatial significant weather conditions data 60 from real world space to display space. Part of the flight segment lines 208 corresponding to the geospatial significant weather conditions data 60 in display space is highlighted (in one embodiment) to provide a notification graphic of significant weather conditions that codes the location of the significant weather condition without revealing a detailed map. Only part of one flight segment line 208 (connecting neighboring waypoints 210) may include the highlighting of the notification graphic 204A, 204B when the significant weather condition is only located along part of the flight segment line 208. The display generation module 30 can generate the notification graphic in a number of ways including the shown colored (e.g. blue) and width expanded portions of the flight segment line or lines 208.

In embodiments, the processing system 22 includes a notification graphic selection module 38 for detecting when the notification graphic 204A, 204B has been selected through the user input device 32. The display generation module 30 may provide location information in display space (e.g. pixel coordinates) for the notification graphic 204A, 204B. The notification graphic selection module 38 can provide information on a location of a user selection in display space. When the user selection is located on the notification graphic 204A, 204B, then the notification graphic selection module 38 outputs selection/deselection data 64 indicating that the notification graphic 204A, 204B has been selected or deselected. Selection/deselection can be performed in a number of ways such as by touch tapping the notification graphic 204A, 204b once for selection and then again for deselection or by clicking a button (physical or virtual) of the user input device 32 when the cursor 212 is located on the notification graphic 204A, 204B. In one embodiment, the notification graphic selection module 38 detects when the cursor 212 is hovering or positioned over the notification graphic 204A, 204B in order to determine selection of the notification graphic 204A, 204B. The notification graphic selection module 38 detects when the cursor 212 is not hovering over or is elsewhere positioned than on the notification graphic 204A, 204B in order to determine deselection of the notification graphic 204A, 204B. The notification graphic selection module 38 outputs the selection/deselection data 64, which indicates whether the notification graphic 204A, 204B has been selected or deselected.

The display generation module 30 is responsive to the selection/deselection data 64 indicating selection and deselection of the notification graphic 204A, 204B. When the display generation module 30 displays the first weather presentation 200 of FIG. 3 and receives a selection of the notification graphic 204A, 204B (e.g. by the cursor 212 being located over the notification graphic 204A, 204B), the display generation module 30 changes the display to the second weather presentation 220 shown in FIG. 4. The second weather presentation 220 additionally includes the second graphical map 206 of significant weather conditions, which includes a detailed map (geospatial weather data) of the significant weather conditions data 60 associated with the selected notification graphic 204A, 204B. Further, the first graphical map 202 will be faded (or displayed more lightly) than with the first weather presentation 200. The fading process may be shown as a video (e.g. occurring in multiple fading steps over multiple frames of display data) in order to allow the viewer to clearly differentiate the radar weather data relative to the transmitted weather data. Other differentiation of the first graphical map 202 in the second weather presentation 220 as compared to the first weather presentation 200 is possible such as making it darker or including a line around a periphery or other visual effect such as different shading. Again, the transition may be staged over multiple frames to allow easy identification of the change in the form of a video. It will be appreciated that color coding of radar weather data and transmitted weather data is often similar (e.g. including green, yellow and red to indicating progressively greater severity) such that schemes for distinguishing the first and second graphical maps 202, 220 without changing the colors provide an important visual aid when transitioning from the first weather presentation 200 to the second weather presentation 220.

When the display generation module 30 displays the second weather presentation 220 of FIG. 4 and receives a deselection of the notification graphic 204A, 204B (e.g. by the cursor 212 moving away from being located over the notification graphic 204A, 204B), the display generation module 30 changes the display to the first weather presentation 200 shown in FIG. 3. As such, the second graphical map 206 is removed such that only the first graphical map 202 provides a detailed map of weather data. The user is thus able to repeatedly move the cursor on and off the notification graphic 204A, 204B to switch between showing the first graphical map 202 without the second graphical map 220 and showing the first and second graphical maps 202, 220 together, with the first graphical map 202 switching between being shown relatively light and relatively dark. This provides a fast and intuitive way to easily cross-reference weather data from radar and transmitted weather sources in the same moving map type weather presentation. Although the weather presentations 200, 220 are particularly described and shown with respect to horizontal situational views on moving maps, similar functionality could be provided for vertical situational views.

FIG. 3 is an exemplary first weather presentation 200 generated by the cockpit display system 12. The first weather presentation 200 is in the form of a moving map on a navigational display (horizontal situation indicator). The first weather presentation 200 includes a terrain background, which is generated based on information form a terrain database. The first weather presentation 200 includes a graphical directional indicator (e.g. an at least partial compass ring) 216 and a graphical range indicator (e.g. an at least partial range ring) 214 to show the scale of the moving map. The first weather presentation 200 includes an ownship graphic 214 to indicate a current location of the aircraft 10 on the moving map based on sensed location (e.g. from GPS receiver information). The first weather presentation 200 includes flight segment lines 208 connecting waypoints 210, which are generated based on the flight plan data 54. The first weather presentation 200 includes first and second notification graphics 204A, 204B of significant weather conditions, which are based on the significant weather conditions data 60. The first and second notification graphics 204A, 204B include highlighting of the flight segment lines 208 at locations corresponding to locations of the corresponding significant weather condition. The first notification graphic 204A corresponds to a first significant weather condition. The second notification graphic 204B corresponds to a second significant weather condition that is distinct from the first significant weather condition and located on a different flight segment line 208 (or located on a different part of the same flight segment line 208). The first and second notification graphics 204A, 204B are independently selectable to cause generation of different second graphical maps of the respective significant weather condition. The first and second notification graphics 204A, 204B include an outlining of the flight segment line 208 (or part thereof) that is a different color from the flight segment line 208 (e.g. blue notification graphic 204A, 204B versus a white flight segment line 208). For example, the first and second notification graphics 204A, 204B are in the form of colored bars on one or both sides of the flight segment line 208. The first weather presentation 200 includes the first graphical map 202 of the radar weather data 52. The first graphical map 202 has a two dimensional area in display space that is sized and contoured based on the weather in real space as detected by the weather radar 18. Further, the first graphical map 202 includes color coding indicating at least one of type of weather and density/severity of weather.

FIG. 4 is an exemplary second weather presentation 220 generated by the cockpit display system 12. The second weather presentation 220 is generated when the cursor 212 is detected to be located over (or a selection is otherwise made on) one of the notification graphics 204A, 204B. In FIG. 4, the second notification graphic 204B has been selected, which results in display of the second graphical map 206 of the significant weather condition corresponding to (or coded by) the second notification graphic 204B. Had the first notification graphic 204A been selected, the significant weather condition associated with the first notification graphic 204A would have been displayed. The second graphical map 206 has an area and contour in scaled display space based on the area and coverage of the significant weather condition in real space as described in the significant weather conditions data 60. The second graphical map 206 includes color coding to indicate at least one of type and density/severity of the weather. The color coding scheme for the first and second graphical maps 202, 206 may be the same. The second weather presentation 220 includes the first graphical map 202 of radar weather data (which is continually updating based on new radar weather data 52) but in a visually differentiated way than in the first weather presentation such as by being displayed lighter, darker or with different shading styles, without changing the coloring scheme.

FIG. 2 is a process flow chart detailing a method 100 for displaying significant weather information in the cockpit display system 12. The order of operation within the method 100 is not limited to the sequential execution as illustrated in the figure, but may be performed in one or more varying orders as applicable and in accordance with the present disclosure. Steps of the of method 100 are performed by the one or more processors 34 of the processing system 22 executing computer programming instructions of the computer programs 36. Method 100 may be instigated when a selection is made by a user through the user input device 32 to display radar weather data 52 on the navigation display of the display device 20.

The method 100 includes step 110 of receiving transmitted weather data 50 at the weather data receiver 16. The transmitted weather data 50 may be uplinked from one or more ground stations, downlinked from one or more satellites or transmitted from one or more other aircraft.

The method 100 includes step 120 of receiving a flight plan from the FMS 14 in the form of flight plan data 54. The flight plan is set based at least partly on user selections through user input device 32 and navigation information from a navigation database.

The method 100 includes step 130 of identifying and extracting significant weather conditions data 60 from the transmitted weather data 50. Step 130 includes identifying and extracting significant weather conditions data 60 that meets applied weather criteria and applied proximity to flight plan criteria.

The method 100 includes step 140 of generating the first weather presentation 200 including the notification graphic 204A, 204B on one or more parts of the flight segment lines 208 of the flight plan indication. The first weather presentation 200 further includes the first graphical map 202 of the radar weather data 52, which has been received by the onboard weather radar 18. There may be more than one notification graphic 204A, 204B in the first weather presentation 200 when there is more than one significant weather condition in the area displayed by the first weather presentation 200. Each notification graphic 204A, 204B represents the presence of a significant weather condition at the location of the flight plan, but does not map the significant weather condition in any detail (e.g. by displaying two dimensional coverage and contour of the significant weather condition and color coding severity/intensity/type of the significant weather condition).

The method 100 includes step 150 of detecting a selection of the notification graphic 204A, 204B (or one of the notification graphics 204A, 204B when there are more than one notification graphics 204A, 204B). The user operates the user input device 32 to move the cursor 212 from a position away from the notification graphic 204A, 204B to a position overlapping the notification graphic 204A, 204B. Mere positioning of the cursor 212 may constitute a selection of the notification graphic 204A, 204B. Alternatively, a further active selection may be required (e.g. by pressing a button on the user input device). Other non-cursor based selections (e.g. touch screen) of the notification graphic 204A, 204B are envisaged.

The method 100 includes step 160 of generating the second weather presentation 220 in response to selection of the notification graphic 204A, 204B. The second weather presentation 220 includes displaying of the significant weather data corresponding to the notification graphic 204A, 204B. In the case of more than one notification graphic 204A, 204B being displayed, each notification graphic represents a different significant weather condition defined by different significant weather conditions data 60. When the first notification graphic 204A is selected, the significant weather conditions data 60 defining a first significant weather condition associated therewith is used for generating the second graphical map 206. When the second notification graphic 204B is selected, the significant weather conditions data 60 defining a second significant weather condition associated therewith is used for generating the second graphical map 206. The second graphical map 206 includes a map representing a size and contour of the significant weather condition that is to scale and includes color coding to represent an intensity/severity/density and/or type of weather. In the second weather presentation 220, the first graphical map 202 is also shown, but at a changed brightness or altered shading than in the first graphical map 202. The brightness change or shading alteration may be staged over multiple display frames to provide a video changing effect.

In method step 170, a deselection of the notification graphic 204A, 204B is detected. The deselection may be performed by the user moving the cursor 212, through operation of the user input device 32, into a position that is not overlapping with the notification graphic 204A, 204B. The deselection may be performed merely by the movement of the cursor 212 or by an additional deactivation such as pressing a button of the user input device 32. Other deselection methods are possible.

In method step 18, the first weather presentation 200 is generated, which includes the first graphical map 202 of the radar weather data 52 but with the brightness or shading change from the second weather presentation 220 reversed. Further, the second graphical map 206 is removed in the first weather presentation 200.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. For example, the solution can be further broadened to non-weather information (e.g. airspaces). It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A cockpit display system of an aircraft, the cockpit display system comprising:
 a flight management system (FMS);
 an uplink weather receiver;
 a weather radar located in the aircraft;
 a display device;
 at least one processor in operable communication with the FMS, the display device, the uplink weather receiver and the weather radar, the at least one processor configured to execute program instructions, wherein the program instructions are configured to cause the at least one processor to:
  receive transmitted weather data from the uplink weather receiver;
  receive a flight plan from the FMS;
  generate a display of at least part of the flight plan for the display device;
  search for significant weather conditions along the flight plan based on the transmitted weather data;
  when the search determines that the flight plan is passing through or sufficiently close to at least one significant weather condition:
    extract significant weather conditions data for the at least one significant weather condition from the transmitted weather data;
    generate the display to include a first graphical map of real-time weather data from the weather radar and to include a notification graphic associated with one or more portions of the at least part of the flight plan at which the at least one significant weather condition will occur and not to include a second graphical map of the at least one significant weather condition based on the significant weather conditions data;
    receive a selection of the notification graphic; and
    in response to selection of the notification graphic, generate the display to include the first graphical map of the real time weather data based on weather data from the weather radar and to include the second graphical map of the at least one significant weather condition based on the significant weather conditions data.

2. The cockpit display system of claim 1, wherein the at least part of the flight plan includes a plurality of flight segments and the notification graphic is associated with one of the flight segments at which the at least one significant weather condition will occur.

3. The cockpit display system of claim 1, wherein display of the at least part of the flight plan includes flight segment lines extending between waypoints and the notification graphic includes highlighting around a flight segment line.

4. The cockpit display system of claim 1, wherein the selection of the notification graphic is made by a cursor being positioned over the notification graphic.

5. The cockpit display system of claim 1, wherein, in response to selection of the notification graphic, the display is generated to include the first graphical depiction of the real time weather data more dimly than when the notification graphic is deselected.

6. The cockpit display system of claim 5, wherein the notification graphic is deselected by a cursor not being positioned over the notification graphic.

7. The cockpit display system of claim 1, wherein the second graphical map of the at least one significant weather condition is shown and hidden depending on whether the notification graphic is selected or deselected.

8. The cockpit display system of claim 7, wherein the notification graphic is selected or deselected by a cursor hovering over or not hovering over the notification graphic, respectively.

9. The cockpit display system of claim 1, wherein the search for significant weather conditions along the flight plan includes applying, to the transmitted weather data, a weather relevancy filter using one or more weather criteria and applying a distance relevancy filter using one or more criteria of distance relative to the flight plan.

10. The cockpit display system of claim 9, wherein the weather criteria are adaptive to status or defect reports from aircraft components or systems.

11. A method of displaying weather data for a cockpit display system of an aircraft, the method comprising:
  receiving, via at least one processor, transmitted weather data from an uplink weather receiver of the cockpit display system;
  receiving, via the at least one processor, a flight plan from a flight management system of the cockpit display system;
  generating, via the at least one processor, a display of at least part of the flight plan for a display device of the cockpit display system;
  searching, via the at least one processor, for significant weather conditions along the flight plan based on the transmitted weather data;
  when the search determines that the flight plan is passing through or sufficiently close to at least one significant weather condition:
    extracting, via the at least one processor, significant weather conditions data for the at least one significant weather condition from the transmitted weather data;
    generating, via the at least one processor, the display to include a first graphical map of real-time weather data from the weather radar and to include a notification graphic associated with one or more portions of the at least part of the flight plan at which the at least one significant weather condition will occur and not to include a second graphical map of the at least one significant weather condition based on the significant weather conditions data;
    receiving, via the at least one processor, a selection of the notification graphic; and
    in response to selection of the notification graphic, generating, via the at least one processor, the display to include the first graphical map of the real time weather data based on weather data from the weather radar and to include the second graphical map of the at least one significant weather condition based on the significant weather conditions data.

12. The method of claim 11, wherein the at least part of the flight plan includes a plurality of flight segments and the notification graphic is associated with one of the flight segments at which the at least one significant weather condition will occur.

13. The method of claim 11, wherein display of the at least part of the flight plan includes flight segment lines extending between waypoints and the notification graphic includes highlighting around a flight segment line.

14. The method of claim 11, wherein the selection of the notification graphic is made by a cursor being positioned over the notification graphic.

15. The method of claim 11, wherein, in response to selection of the notification graphic, the display is generated to include the first graphical depiction of the real time weather data more dimly than when the notification graphic is deselected.

16. The method of claim 15, wherein the notification graphic is deselected by a cursor not being positioned over the notification graphic.

17. The method of claim 11, wherein the second graphical map of the at least one significant weather condition is shown and hidden depending on whether the notification graphic is selected or deselected.

18. The method of claim 17, wherein the notification graphic is selected or deselected by a cursor hovering over or not hovering over the notification graphic, respectively.

19. The method of claim 11, wherein the searching for significant weather conditions along the flight plan includes applying, to the transmitted weather data, a weather relevancy filter using one or more weather criteria and applying a distance relevancy filter using one or more criteria of distance relative to the flight plan.

20. The method of claim 19, wherein the weather criteria are adaptive to status or defect reports from aircraft components or systems.

* * * * *